United States Patent
Lee et al.

(10) Patent No.: US 8,165,047 B2
(45) Date of Patent: Apr. 24, 2012

(54) APPARATUS AND METHOD FOR FORWARD LINK OUTER LOOP RATE CONTROL USING HYBRID AUTOMATIC REPEAT REQUEST IN MOBILE COMMUNICATION SYSTEMS

(75) Inventors: In-Taek Lee, Seoul (KR); Jang-Hoon Yang, Seongnam-si (KR); In-Seok Hwang, Seoul (KR); June Moon, Seoul (KR)

(73) Assignee: Samsung Electronics Co., Ltd (KR)

( * ) Notice: Subject to any disclaimer, the term of this patent is extended or adjusted under 35 U.S.C. 154(b) by 1119 days.

(21) Appl. No.: 11/965,513

(22) Filed: Dec. 27, 2007

(65) Prior Publication Data

US 2008/0159192 A1 Jul. 3, 2008

(30) Foreign Application Priority Data

Dec. 29, 2006 (KR) .................... 10-2006-0137690

(51) Int. Cl.
*H04B 7/00* (2006.01)
*H04B 3/46* (2006.01)

(52) U.S. Cl. ...................... 370/310; 375/225

(58) Field of Classification Search ............ 375/225; 370/252, 389, 310, 230, 235, 328, 381, 341, 370/363, 395; 714/749, 776
See application file for complete search history.

(56) References Cited

U.S. PATENT DOCUMENTS

| | | | | |
|---|---|---|---|---|
| 7,187,657 | B2* | 3/2007 | Koide et al. | 370/252 |
| 7,400,674 | B2* | 7/2008 | Gu | 375/225 |
| 7,522,544 | B2* | 4/2009 | Cheng et al. | 370/310 |
| 7,869,417 | B2* | 1/2011 | Damnjanovic et al. | 370/347 |
| 2003/0067890 | A1* | 4/2003 | Goel et al. | 370/310.1 |
| 2005/0007968 | A1* | 1/2005 | Hsu et al. | 370/310 |
| 2005/0201453 | A1* | 9/2005 | Gu | 375/225 |
| 2007/0115899 | A1* | 5/2007 | Ovadia et al. | 370/338 |
| 2007/0217539 | A1* | 9/2007 | Ihm et al. | 375/267 |
| 2007/0253339 | A1* | 11/2007 | Ovadia et al. | 370/252 |
| 2008/0159192 | A1* | 7/2008 | Lee et al. | 370/310 |
| 2010/0150039 | A1* | 6/2010 | Lundby et al. | 370/310 |

FOREIGN PATENT DOCUMENTS

| | | |
|---|---|---|
| KR | 1020030037611 | 5/2003 |
| KR | 1020030077733 | 10/2003 |
| KR | 1020050005992 | 1/2005 |

* cited by examiner

*Primary Examiner* — John Blanton
(74) *Attorney, Agent, or Firm* — The Farrell Law Firm, P.C.

(57) ABSTRACT

An apparatus and method for Forward link Outer Loop Rate Control (FOLRC) using Hybrid Automatic Repeat reQuest (HARQ) in a mobile communication system are provided. The method includes receiving information, which indicates success or failure in receiving a packet transmitted in a previous frame, from Mobile Stations (MSs); and decreasing an offset value for changing a CINR value in a link table of each MS when Acknowledgement (Ack) is received as the information indicating success or failure in receiving the packet, and increasing the offset value when a signal received as the information indicating success or failure in receiving the packet is other than the Ack. Accordingly, there is an advantage in that a link table adaptive to a channel condition can be obtained.

24 Claims, 2 Drawing Sheets

APPARATUS AND METHOD FOR FORWARD LINK OUTER LOOP RATE CONTROL USING HYBRID AUTOMATIC REPEAT REQUEST IN MOBILE COMMUNICATION SYSTEMS

PRIORITY

This application claims priority under 35 U.S.C. §119(a) to a Korean patent application filed in the Korean Intellectual Property Office on Dec. 29, 2006 and assigned Serial No. 2006-137690, the entire disclosure of which is hereby incorporated by reference.

BACKGROUND OF THE INVENTION

1. Field of the Invention

The present invention relates to a mobile communication system. More particularly, the present invention relates to an apparatus and method for Forward link Outer Loop Rate Control (FOLRC) a using Hybrid Automatic Repeat reQuest (HARQ) scheme.

2. Description of the Related Art

Mobile communication systems employ a Hybrid Automatic Repeat reQuest (HARQ) scheme (i.e., a physical layer packet retransmission algorithm) in order to increase forward link throughput. In a system employing the HARQ scheme, a Mobile Station (MS) transmits Acknowledgement (Ack) or Negative-acknowledgement (Nack) in response to a packet transmitted from a Base Station (BS) according to success or failure in receiving the packet in a forward link physical layer. Upon receiving the Ack, the BS subsequently transmits a next packet to the MS. Upon receiving the Nack, the BS retransmits a previously transmitted packet to the MS. In this case, instead of discarding the previously received packet, the MS stores the previously received packet in a buffer. When the same packet is retransmitted at a later time, the MS attempts to perform demodulation by combining the retransmitted packet with the previously transmitted packet. Therefore, the HARQ scheme has an advantage in that link throughput can be improved by increasing a probability that a packet is successfully received.

The BS performs Forward link Outer Loop Rate Control (FOLRC) for the purpose of satisfying a Carrier to Interference and Noise Ratio (CINR) value which is requested in an adaptive manner to a changing channel condition. An existing system has a large number of link tables optimized to a channel model (i.e., a movement speed and a surrounding environment). The BS determines a transmission method according to a channel condition of the MS by using a link table fixed to a current channel model. The link table is defined as a table in which Modulation and Coding Scheme (MCS) levels are pre-defined for all CINR values. The BS may evaluate a CINR value by using information (i.e., a Channel Quality Indicator (CQI)) on a data transfer size that can be received from the MS, and allocate an MCS level corresponding to the evaluated CINR value to the MS. In this case, a CINR range occupied by each MCS level in the link table indicates a range in which the MS can successfully receive data with a Packet Error Rate (PER) of less than 1% when the BS transmits to the MS the data coded and modulated according to the assigned MCS level.

The link table is optimized to a worst-case channel condition in order to avoid errors. Since the CQI does not have overall channel information, it is difficult for the link table to correctly indicate the channel condition. Accordingly, when the link table fixed as mentioned above is used, channel adaptation significantly deteriorates. Therefore, although the BS is able to allocate a higher order MCS level to the MS, the BS allocates a lower order MCS level to the MS by depending entirely upon the currently operating link table, i.e., a data transfer rate is assigned to have a relatively smaller system capacity than a currently available system capacity. Therefore, when the aforementioned fixed link table is used, in order for the BS to adaptively allocate an MCS level according to the channel condition of the MS, an additional channel estimation algorithm that can predict the channel condition is required, and switching must be performed on the link table by using this algorithm.

SUMMARY OF THE INVENTION

An aspect of the present invention is to address at least the above-mentioned problems and/or disadvantages and to provide at least the advantages described below. Accordingly, an aspect of the present invention is to provide an apparatus and method for effective Forward link Outer Loop Rate Control (FOLRC) using Hybrid Automatic Repeat reQuest (HARQ) in a mobile communication system.

Another aspect of the present invention is to provide an apparatus and method for obtaining a link table adaptive to a channel condition in such a manner that required Carrier to Interference and Noise Ratio (CINR) values assigned to all MCS levels are adaptively increased or decreased according to information indicating success or failure in receiving a packet in an arbitrarily configured link table in a mobile communication system.

According to one aspect of the present invention, a method for FOLRC in a Base Station (BS) is provided. The method includes receiving information, which indicates success or failure in receiving a packet transmitted in a previous frame, from Mobile Stations (MSs); and decreasing an offset value for changing a CINR value in a link table of each MS when an Acknowledgement message (Ack) is received as the information indicating success or failure in receiving the packet, and increasing the offset value when a signal received as the information indicating success or failure in receiving the packet is a signal other than the Ack.

According to another aspect of the present invention, an apparatus for FOLRC in a BS is provided. The apparatus includes a receiver for receiving information, which indicates success or failure in receiving a packet transmitted in a previous frame, from MSs; and an FOLRC unit for decreasing an offset value for changing a CINR value in a link table of the MS when Ack is received as the information indicating success or failure in receiving the packet, and increasing the offset value when a signal received as the information indicating success or failure in receiving the packet is a signal other than the Ack.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Figure 1A:
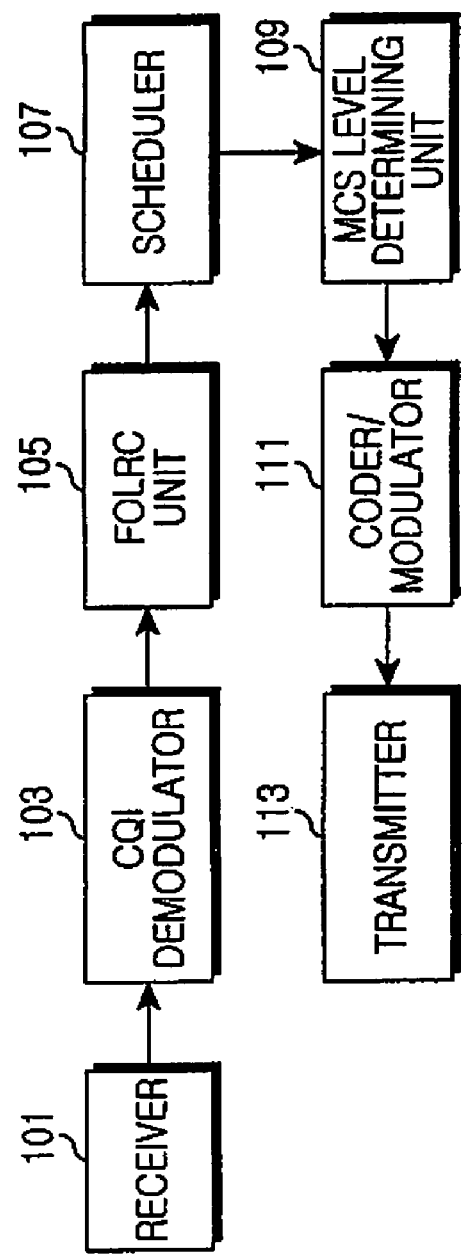
FIGS. 1A and 1B are block diagrams illustrating a structure of a mobile communication system according to the present invention.

Preferred embodiments of the present invention will be described below with reference to the accompanying drawings. In the following description, well-known functions or constructions are not described in detail since they would obscure the invention in unnecessary detail.

The present invention relates to an apparatus and method for effective Forward link Outer Loop Rate Control (FOLRC) using Hybrid Automatic Repeat reQuest (HARQ) in a wireless communication system.

In the following descriptions, an FOLRC state of a Base Station (BS) is either a no-data state or a normal state. The no-data state is a state in which forward link packets are not continuously transmitted. The normal state is a default state and is a state in which the forward link packets are continuously transmitted and response data is received in response thereto. When the BS is not in the no-data state, the BS maintains the normal state and transitions to the no-data state, if the response data for a previously transmitted packet is not received during a specific frame. In this case, the BS must store a frame number of the most recently received frame at which the response data is received, or store the number of consecutive frames that are not received. When the response data for the previously transmitted packet is received, the BS determines whether the previously transmitted packet is a re-transmitted packet or an initially transmitted packet, and performs an FOLRC operation, proposed by the present invention, only for the initially transmitted packet.

The BS has link tables for all users (or Mobile Stations (MSs)), and changes a link table for a specific MS according to a success or failure in receiving a previously transmitted packet by referencing a target Packet Error Rate (PER) of the MS with respect to all states. That is, a Carrier to Interference and Noise Ratio (CINR) value required for each Modulation and Coding Scheme (MCS) is up/down and thus an independent link table that is adaptive to a current channel condition can be obtained for each user. Therefore, there is no need to create a link table having different CINR values for respective MSs. Further, each user has a link table suitable for the current channel condition during performance of the FOLRC operation. In order to change the link table in response to changes in the FOLRC state, in addition to the above link table suitable for the current channel condition for each user, the BS maintains an initial link table.

In the following descriptions, a global offset (hereinafter, "Offset_Global") value is defined as a value for shifting all CINR values assigned to corresponding MCS levels in a link table. In practice, this value does not change a link table value itself but only produces a change effect. For example, if the Offset_Global value is −1, a CINR value assigned to a specific MCS level can be decreased by 1 from a previous CINR value. A local offset (hereinafter, "Offset_Local(MCS)") value for an MCS level of a burst allocated to a previous frame is a value defined as a CINR value of a specific MCS level. In practice, this value changes the link table value itself. Although both the Offset_Global value and the Offset_Local (MCS) value are used in the following descriptions, the present invention is not limited thereto. Thus, only one of the two values may be used in practice, and when both the two values are used, weights of the Offset_Global value and the Offset_Local(MCS) value may be used differently. Here, the Offset_Global value and the Offset_Local(MCS) value are defined as values for changing a first CINR value in a CINR range occupied by the MCS levels in the link table.

In the present invention, when an Acknowledgement message (Ack) for a previously transmitted packet is received from the MS, the Offset_Global value and the Offset_Local (MCS) value in the link table of the MS are decreased, so that the MS is assigned with an MCS level higher than the previous MCS level by a value equal to an offset variation. In addition, when an Negative-Ack message (Nack) or Erasure for the previously transmitted packet is received from the MS, the Offset_Global value and the Offset_Local(MCS) value in the link table of the MS are increased, so that the MS is assigned with an MCS level lower than the previous MCS level by the value equal to the offset variation. Here, the Erasure indicates that the MS fails to receive a packet even though the number of times of retransmitting the packet exceeds a threshold. When the Erasure for the packet is transmitted by the MS and received by the BS, the MS, and the BS discard the packet.

Table 1 below describes definitions of parameters for offset values proposed by the present invention.

TABLE 1

| Parameter | Description |
|---|---|
| $P_{max,Global}$ | maximum Offset_Global value |
| $P_{max,Local}$ | maximum Offset_Local(MCS) value |
| $P_{min,Global}$ | minimum Offset_Global value |
| $P_{min,Local}$ | minimum Offset_Local(MCS) value |
| $P_{init,Global}$ | initial Offset_Global value |
| $P_{init,Local}$ | initial Offset_Local(MCS) value |
| $\Delta_{bad,n}$ | increment of Offset_Global/Local(MCS) value when Nack/Erasure is received in normal state |
| $\Delta_{good,n}$ | decrement $\left(\frac{P_T}{1-P_T} * \Delta_{bad,n}\right)$ of Offset_Global/Local(MCS) value when Ack is received in normal state |
| $\alpha$ | weight of Offset_Local(MCS) value $\Delta_{bad,n,Global} = (1-\alpha) \cdot \Delta_{bad,n}$ $\Delta_{good,n,Global} = (1-\alpha) \cdot \Delta_{good,n}$ $\Delta_{bad,n,Local} = (\alpha) \cdot \Delta_{bad,n}$ $\Delta_{good,n,Local} = (\alpha) \cdot \Delta_{good,n}$ |
| $P_T$ | target PER (%) for initial transmission |
| $N_{nd}$ | transition to no-data state when no data is received during $N_{nd}$ frame in normal state |
| $P_{nd,max}$ | maximum Offset_Global value in no-data state |
| $\Delta_{nd,step}$ | increment of Offset_Global value in no-data state |

Figure 1B:
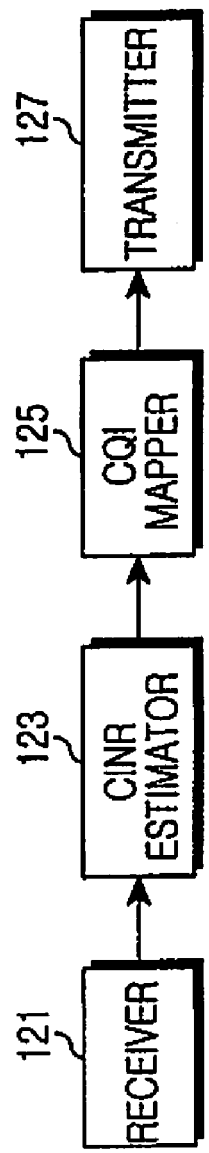

FIGS. 1A and 1B are block diagrams illustrating a structure of a mobile communication system according to the present invention. The mobile communication system includes a BS and an MS. As shown in FIG. 1A, the BS includes a receiver 101, a Channel Quality Indicator (CQI)) demodulator 103, an FOLRC unit 105, a scheduler 107, an MCS level determining unit 109, a coder/modulator 111, and a transmitter 113. As shown in FIG. 1B, the MS includes a receiver 121, a CINR estimator 123, a CQI mapper 125, and a transmitter 127.

Referring first to FIG. 1A, the BS is constructed such that the receiver 101 periodically receives CQI information from a plurality of MSs and receives information, which indicates whether a forward link packet transmitted in a previously transmitted packet was successfully received, from the MSs that have been scheduled in the previous frame. The CQI demodulator 103 demodulates the received CQI information and obtains CINR values according to the demodulated CQI information.

Only when the forward link packet of the previous frame is not a retransmitted packet but an initially transmitted packet, the FOLRC unit 105 updates an Offset_Global value and an Offset_Local(MCS) value in a link table of a specific MS by using the information indicating whether the packet was successfully received. In this case, these values are updated in a different manner according to an FOLRC state of the BS. Thereafter, the FOLRC unit 105 changes a CINR value assigned to a specific MCS level by using the updated Offset_Local(MCS) value, and thus updates the link table of the MS.

By using the obtained CINR values for all users (or MSs) and the information indicating whether the packet was successfully received, the scheduler 107 schedules the users to which the forward link packet is transmitted in a current frame. If the Offset_Global value is a value of an updated user, the FOLRC unit 105 applies the updated Offset_Global value to a corresponding CINR value, and uses the resultant value in the scheduling process.

The MCS level determining unit 109 determines an MCS level of a specific MS by using the link table and the CINR values of the scheduled users, i.e., for each scheduled user, an MCS level assigned to a corresponding CINR value is searched for from the link table, and the found MCS level is determined as the MCS level of the MS. If the user scheduled by the FOLRC unit 105 is a user whose Offset_Global value and Offset_Local(MCS) value are updated, the MCS level determining unit 109 determines the MCS level of the MS by using the link table updated according to the updated Offset_Local(MCS) value and the CINR value according to the updated Offset_Global value. The coder/modulator 111 codes and modulates the forward link packet to be transmitted to the scheduled users according to the determined MCS level of the MS. The transmitter 113 transmits the coded and modulated forward link packet to the MS.

Referring now to FIG. 1B, the MS is constructed such that the receiver 121 receives a forward link packet from the BS and determines whether the packet was successfully received by checking an error from the received packet. The CINR estimator 123 periodically estimates CINR values. The CQI mapper 125 generates CQI information according to the estimated CINR values. The transmitter 127 transmits to the BS the generated CQI information together with the determined information indicating whether the packet was successfully received.

Figure 2:
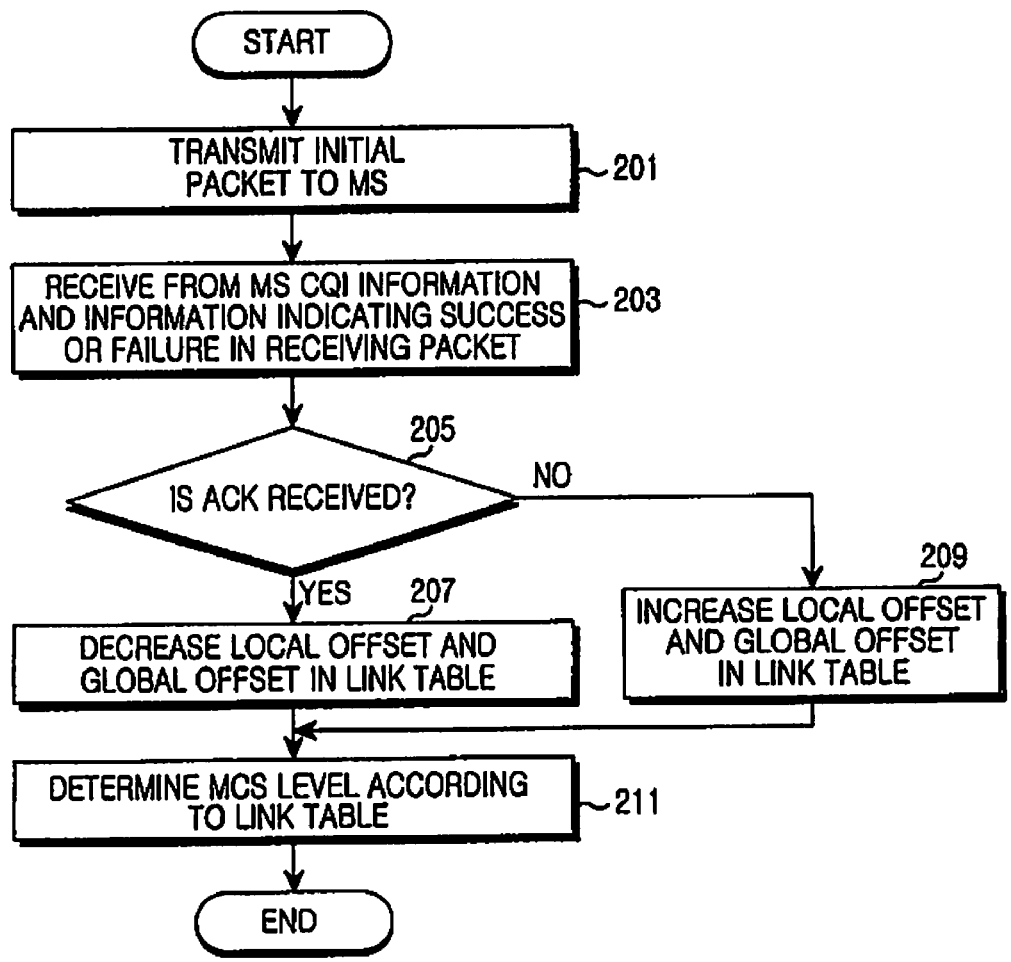
FIG. 2 is a flowchart illustrating a Forward link Outer Loop Rate Control (FOLRC) method in a mobile communication system according to the present invention.

FIG. 2 is a flowchart illustrating an FOLRC method in a mobile communication system according to the present invention. Herein, an FOLRC state of a BS is a normal state.

Referring to FIG. 2, the BS transmits an initial packet to an MS in step 201. The MS receives the initial packet, determines whether the packet was successfully received, and transmits, to the BS, information indicating the success or failure together with CQI information obtained by CINR estimation. As a result, the BS receives, from the MS, the CQI information and the information indicating success or failure in receiving the packet in step 203. In this case, the BS obtains CINR values according to the received CQI information.

In step 205, the BS determines whether an Ack is received as the information indicating success or failure in receiving the packet. Upon receiving the Ack, an Offset_Local(MCS) value and an Offset_Global value in a link table of the MS are decreased in step 207.

The Offset_Global value and the Offset_Local(MCS) value, which corresponds to an MCS level of a burst allocated to a previous frame, are decreased by using Equation (1) below. The two offset values must not be decreased to below predetermined minimum values, respectively.

$$\text{Offset\_Global} = \min(\text{Offset\_Global} - \Delta_{good,n,Global}, P_{min,Global})$$

$$\text{Offset\_Local(MCS)} = \min(\text{Offset\_Local(MCS)} - \Delta_{good,n,Local}, P_{min,Local})$$

$$\text{Offset\_Local(MCS)} = \max(\text{Offset\_Local(MCS)}, \text{Offset\_Local(MCS-1)} - \text{LT\_DIFF(MCS)})$$

$$\text{Offset\_Local(MCS)} = \min(\text{Offset\_Local(MCS)}, \text{Offset\_Local(MCS+1)} + \text{LT\_DIFF(MCS+1)}) \quad (1)$$

In Equation (1), the third expression can be applied only when an MCS level is greater than 0, and the fourth expression can be applied only when the MCS level is less than a maximum MCS level. These two expressions are obtained by using an Offset_Local(MCS) calculated according to the second expression. For example, if the second to fourth expressions can be applied to an MCS level, the Offset_Local(MCS) value for the MCS level is decreased to a final value obtained throughout the second to fourth expressions. Herein, LT_DIFF(MCS) can be expressed by Equation (2) below.

$$\text{LT\_DIFF(MCS)} = \text{LT(MCS)} - \text{LT(MCS-1)} \quad (2)$$

In Equation (2), LT(MCS) denotes a reference CINR value of a specific MCS level in the link table, for example, a first CINR value in a CINR range occupied by the MCS levels. Herein, LT_DIFF(MCS) is always a positive value, and as shown in the third and fourth expressions of Equation (1) above, the positive value is subtracted from an Offset_Local (MCS) value of a low MCS level so as to prevent the Offset_Local(MCS) value from increasing to above an Offset_Local (MCS) value of a high MCS level. Further, the positive value is added to the Offset_Local(MCS) value of the high MCS level so as to prevent the Offset_Local(MCS) value of the high MCS level from decreasing to below the Offset_Local (MCS) value of the low MCS level.

If the MCS level is 0, according to whether requirements of Equation (3) below is satisfied, an Offset_Local(MCS) is computed by using the Offset_Local(MCS) calculated using the second expression of Equation (1) above, which is expressed by Equation (3) below.

If $abs(\text{Offset\_Local}(1) + \text{LT\_DIFF}(1) - \text{Offset\_Local}(0))$
$< \text{LT\_DIFF\_MIN}$, $$\text{Offset\_Local}(0) = \text{Offset\_Local}(0) - \text{Zero\_Offset\_Comp}; \quad (3)$$

In Equation (3), LT_DIFF_MIN may be set to 1 and Zero_Offset_Comp may be set to 0.5 as default values.

However, when a Nack (or Erasure) is received as information indicating success or failure in receiving the packet, the Offset_Local(MCS) value and the Offset_Global value in the link table are increased in step 209.

Herein, the Offset_Global value and the Offset_Local (MCS) value, which corresponds to an MCS level of a burst allocated to a previous frame, are increased by using Equation (4) below. In this case, the two offsets must not be increased to values greater than the predetermined maximum values, respectively.

$$\text{Offset\_Global} = \min(\text{Offset\_Global} + \Delta_{bad,n,Global}, P_{max,Global})$$

$$\text{Offset\_Local(MCS)} = \min(\text{Offset\_Local(MCS)} + \Delta_{bad,n,Local}, P_{max,Local})$$

$$\text{Offset\_Local(MCS)} = \max(\text{Offset\_Local(MCS)}, \text{Offset\_Local(MCS-1)} - \text{LT\_DIFF(MCS)})$$

$$\text{Offset\_Local(MCS)} = \min(\text{Offset\_Local(MCS)}, \text{Offset\_Local(MCS+1)} + \text{LT\_DIFF(MCS+1)}) \quad (4)$$

In Equation (4), the third expression can be applied only when the MCS level is greater than 0, and the fourth expression can be applied only when the MCS level is less than a maximum MCS level. These two expressions are obtained by using an Offset_Local(MCS) calculated according to the second expression. Herein, LT_DIFF(MCS) also can be expressed as Equation (2) above. If the MCS level is 0, the Offset_Local(MCS) is calculated according to Equation (3) above.

In step 211, the BS updates the link table of the MS by changing a CINR value of a specific MCS level according to the Offset_Local(MCS) value decreased or increased in step 207 or 209, and determines the MCS level according to the updated link table when the MS is scheduled. In this case, by using a CINR value, to which an offset value for the MS is applied, and information indicating success or failure in receiving a packet transmitted in a previous frame, the BS schedules the MS to which the packet is transmitted in a current frame. When the MS is scheduled, the BS searches the updated link table to find an MCS level corresponding to the CINR value applied with the offset value in the updated link table and thus determines the found MCS level as the MCS level of the MS.

Thereafter, the procedure of FIG. 2 ends.

Meanwhile, when the FOLRC state of the BS enters to the no-data state, the BS initializes the Offset_Local(MCS) value to zero, and updates the Offset_Global value according to Equation (5) below.

$$\text{Offset\_Global} = \min(\text{Offset\_Global} + \Delta_{nd,step}, P_{nd,max}) \quad (5)$$

Thereafter, upon receiving a Nack (or Erasure) or an Ack, the BS transitions to the normal state and operates in a normal mode.

Accordingly, a data transfer rate suitable for the current channel condition is assigned to all users within a system.

Meanwhile, upon receiving a Nack/Erasure in the normal state, an increment of the Offset_Global/Local(MCS) value is set to be relatively greater than a decrement of the Offset_Global/Local(MCS) value. As a result, an offset value for the case where a Nack is continuously received from the MS increases to be relatively greater than a decrement for the case where an Ack is continuously received. Therefore, an MCS level relatively lower than a previous MCS level is assigned. Through HARQ, recovery of an error packet previously generated is attempted.

Table 2 below shows a simulation result using the FOLRC method proposed by the present invention. The simulation is carried out in consideration of one user, and it is assumed that the user moves at a speed of 3 km, and performing scheduling uses a proportional fair algorithm. An initial link table in use is shown in Table 3 below. In Table 3, a 'good table' denotes a link table in which values are set similar to link table values used in a system in practice, and a 'bad table' denotes a link table in which values are set to arbitrarily determined values.

In this case, as shown in Table 2, when an FOLRC operation according to the present invention is performed by using only Offset_Global, a result obtained is similar to a case where the 'good table' is used instead of the 'bad table'. If only the Offset_Global and the 'good table' is used, about 18% of system capacity difference can be expected, in comparison with the case of using the 'bad table'. However, in the case of using the 'bad table', if only Offset_Local(MCS) is used or if both the Offset_Global and the Offset_Local(MCS) are used, a system capacity difference is about 2% or less, in comparison with a case of using the 'good table'.

TABLE 2

| FOLRC algorithm | Offset_Local (MCS) Weight | Link Table | GoodPut | PER | Gain |
|---|---|---|---|---|---|
| Offset_Global Only | −inf | Good | 2.32E+06 | 0.189 | 0% |
| Offset_Global Only | −inf | Bad | 1.90E+06 | 0.2 | −18% |
| Offset_Local(MSC) Only | inf | Bad | 2.36E+06 | 0.237 | 2% |
| Offset_Global + Offset_Local(MCS) | 1 | Bad | 2.31E+06 | 0.221 | −1% |
| Offset_Global + Offset_Local(MCS) | 10 | Bad | 2.31E+06 | 0.221 | −1% |
| Offset_Global + Offset_Local(MCS) | 100 | Bad | 2.37E+06 | 0.223 | 2% |

TABLE 3

| MCS | Good Table | Bad Table |
|---|---|---|
| 0 | −3.3 | −2 |
| 1 | −0.9 | −1 |
| 2 | 1.7 | 0 |
| 3 | 4.68 | 1 |
| 4 | 8.48 | 11 |
| 5 | 10.3 | 12 |
| 6 | 14.2 | 13 |
| 7 | 14.6 | 14 |
| 8 | 19.5 | 15 |
| 9 | 27.4 | 16 |
| 10 | else | else |

According to the present invention, an apparatus and method for effective Forward link Outer Loop Rate Control (FOLRC) using Hybrid Automatic Repeat reQuest (HARQ) in a mobile communication system are provided. Thus, in an arbitrarily created link table, required Carrier to Interference and Noise Ratio (CINR) values assigned to all Modulation and Coding Scheme (MCS) levels are adaptively increased or decreased by using information indicating success or failure in receiving a packet, thereby obtaining the link table adaptive to a channel condition. That is, there is no need to additionally optimize the link table according to channel models, and the MCS levels can be assigned to Mobile Stations (MSs) in an adaptive manner to a current channel condition. Therefore, overall system performance can be improved.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for Forward link Outer Loop Rate Control (FOLRC) in a Base Station (BS), the method comprising:
   receiving information, which indicates success or failure in receiving a packet transmitted in a previous frame, from Mobile Stations (MSs); and
   decreasing an offset value for changing a Carrier to Interference and Noise Ratio (CINR) value in a link table of each MS when an Acknowledgement message (Ack) is received as the information indicating success or failure in receiving the packet, and increasing the offset value when a signal received as the information indicating success or failure in receiving the packet is a signal other than the Ack, wherein the link table includes CINR values with respect to all Modulation and Coding Scheme (MCS) levels, wherein the offset value is at least one of a global offset value for changing all CINR values assigned to the respective MCS levels in the link table and a local offset value for changing a CINR value assigned to an MCS level of a burst allocated to the previous frame in the link table, and wherein the global offset value, denoted by Offset Global, and the local offset value, denoted by Offset Local (MCS), are decreased by $$\text{Offset\_Global} = \min(\text{Offset\_Global} - \Delta_{good,n,Global}, P_{min,Global})$$

$$\text{Offset\_Local}(MCS) = \min(\text{Offset\_Local}(MCS) - \Delta_{good,n,Local}, P_{min,Local}),$$

where $P_{min,Global}$ denotes a minimum global denotes a minimum local offset value $\Delta_{good,n,Global}$ is $(1-\alpha) \cdot \Delta_{good,n}$, $\Delta_{good,n,Local}$ is a $(\alpha) \cdot \Delta_{good,n}$, $\Delta_{good,n}$ denotes a decrement of the global offset value and the local offset value, and a denotes a weight of the local offset value.

2. The method of claim 1, wherein the offset value is increased or decreased according to a target Packet Error Rate (PER) of each MS.

3. The method of claim 1, wherein the packet is an initially transmitted packet.

4. The method of claim 1, further comprising updating the link table by changing the CINR value in the link table by using the increased or decreased offset value.

5. The method of claim 4, further comprising:

receiving Channel Quality Indicator (CQI) information from each MS and obtaining the CINR value according to the received CQI information;

scheduling each MS, to which the packet is transmitted in a current frame, by using the CINR value applied with a corresponding offset value for each MS and by using the information indicating success or failure in receiving the packet transmitted in the previous frame; and upon scheduling each MS, searching the updated link table to find a Modulation and Coding Scheme (MCS) level corresponding to the CINR value in which the offset value is applied, and determining the found MCS level as an MCS level of a specific MS.

6. The method of claim 1, wherein the $\Delta_{good,n}$ is computed by:

$$\frac{P_T}{1-P_T} * \Delta_{bad,n},$$

where $P_T$ denotes a target PER of an initial transmission, and $\Delta_{bad,n}$ denotes an increment of the global offset value and the local offset value.

7. The method of claim 1, wherein, if the MCS level of the burst allocated to the previous frame is greater than 0, the obtained local offset value is applied to Offset_Local(MCS)=max(Offset_Local(MCS),Offset_Local(MCS−1)−LT_DIFF(MCS)), and if this MCS level is less than a maximum MCS level, the obtained local offset value is applied to Offset_Local(MCS)=min(Offset_Local(MCS),Offset_Local(MCS+1)+LT_DIFF(MCS+1)) LT_DIFF(MCS)=LT(MCS)−LT(MCS−1), thereby finally decreasing the local offset value;

where LT(MCS) denotes a reference CINR value of a corresponding MCS level in the link table.

8. The method of claim 1, wherein, if the MCS level of the burst allocated to the previous frame is 0, the obtained local offset value is applied to If abs(Offset_Local(1)+LT_DIFF(1)−Offset_Local(0)) <LT_DIFF_MIN, Offset_Local(0)=Offset_Local(0)−Zero_Offset_Comp, thereby finally decreasing the local offset value;

where LT_DIFF(MCS) is LT(MCS)−LT(MCS−1), LT(MCS) denotes a reference CINR value of a corresponding MCS level in the link table, LT_DIFF_MIN is set to 1 as a default value, and Zero_Offset_Comp is set to 0.5 as a default value.

9. The method of claim 1, wherein the global offset (i.e., Offset_Global) value and the local offset (i.e., Offset_Local (MCS)) value are increased by Offset_Global=min(Offset_Global+$\Delta_{bad,n,Global}, P_{max,Global}$)

Offset_Local(MCS)=min(Offset_Local(MCS)+$\Delta_{bad,n,Global}, P_{max,Local}$), where $P_{max,Global}$ denotes a maximum global offset value, $P_{max,Local}$ denotes a maximum local offset value, $\Delta_{bad,n,Global}$ is $(1-\alpha) \cdot \Delta_{bad,n}$, $\Delta_{bad,n,Local}$ is $(\alpha) \cdot \Delta_{bad,n}$, $\Delta_{bad,n}$ denotes an increment of the global offset value and the local offset value, and a denotes a weight of the local offset value.

10. The method of claim 9, wherein, if the MCS level of the burst allocated to the previous frame is greater than 0, the obtained local offset value is applied to Offset_Local(MCS)=max(Offset_Local(MCS),Offset_Local(MCS−1)−LT_DIFF(MCS))

and if this MCS level is less than a maximum MCS level, the obtained local offset value is applied to Offset_Local(MCS)=min(Offset_Local(MCS),Offset_Local(MCS+1)+LT_DIFF(MCS+1)) LT_DIFF(MCS)=LT(MCS)−LT(MCS−1), thereby finally increasing the local offset value;

where LT(MCS) denotes a reference CINR value of a corresponding MCS level in the link table.

11. The method of claim 9, wherein, if the MCS level of the burst allocated to the previous frame is 0, the obtained local offset value is applied to If abs(Offset_Local(1)+LT_DIFF(1)−Offset_Local(0)) <LT_DIFF_MIN, Offset_Local(0)=Offset_Local(0)−Zero_Offset_Comp, thereby finally increasing the local offset value;

where LT_DIFF(MCS) is LT(MCS)−LT(MCS−1), LT(MCS) denotes a reference CINR value of a corresponding MCS level in the link table, LT_DIFF_MIN is set to 1 as a default value, and Zero_Offset_Comp is set to 0.5 as a default value.

12. The method of claim 1, further comprising, if the information indicating success or failure in receiving the packet is not received from the MS during a specific frame, initializing the local offset value to zero and updating the global offset value by Offset_Global=min(Offset_Global+$\Delta_{nd,step}, P_{nd,max}$), where $P_{nd,max}$ denotes a maximum global offset value, and $\Delta_{nd,step}$ denotes an increment of the global offset value.

13. An apparatus for Forward link Outer Loop Rate Control (FOLRC) in a Base Station (BS), the apparatus comprising:
a receiver for receiving information, which indicates success or failure in receiving a packet transmitted in a previous frame, from Mobile Stations (MSs); and
an FOLRC processor for decreasing an offset value for changing a Carrier to Interference and Noise Ratio (CINR) value in a link table of each MS when an Acknowledgement message (Ack) is received as the information indicating success or failure in receiving the packet, and for increasing the offset value when a signal received as the information indicating success or failure in receiving the packet is a signal other than the Ack,
wherein the link table includes CINR values with respect to all Modulation and Coding Scheme (MCS) levels,
wherein the offset value is at least one of a global offset value for changing all CINR values assigned to the respective MCS levels in the link table and a local offset value for changing a CINR value assigned to an MCS level of a burst allocated to the previous frame in the link table, and
wherein the global offset (or Offset Global) value and the local offset (or Offset Local(MCS)) value are decreased by Offset_Global = min(Offset_Global − $\Delta_{good,n,Global}, P_{min,Global}$)

Offset_Local(MCS) = min(Offset_Local(MCS) − $\Delta_{good,n,Local}, P_{min,Local}$), where $P_{min,Global}$ denotes a minimum global offset value, $P_{min,Local}$ denotes a minimum local offset value, $\Delta_{good,n,Global}$ is $(1-\alpha) \cdot \Delta_{good,n}$, $\Delta_{good,n,Local}$ is $(\alpha) \cdot \Delta_{good,n}$, $\Delta_{good,n}$ denotes a decrement of the global offset value and the local offset value, and a denotes a weight of the local offset value.

14. The apparatus of claim 13, wherein the offset value is increased or decreased according to a target Packet Error Rate (PER) of each MS.

15. The apparatus of claim 13, wherein the packet is an initially transmitted packet.

16. The apparatus of claim 13, wherein the FOLRC processor updates the link table by changing the CINR value in the link table by using the increased or decreased offset value.

17. The apparatus of claim 16, further comprising:
a Channel Quality Indicator (CQI) demodulator for obtaining CINR values for all MSs according to CQI information received from each MS;
a scheduler for scheduling each MS, to which a packet is transmitted in a current frame, by using the CINR value applied with a corresponding offset value for each MS and by using the information indicating success or failure in receiving the packet transmitted in the previous frame; and
an MCS level determining unit for searching the updated link table of each scheduled MS to find a Modulation and Coding Scheme (MCS) level corresponding to the CINR value in which the offset value is applied and determining the found MCS level as an MCS level of a specific MS,
wherein the receiver receives the CQI information from each MS.

18. The apparatus of claim 13, wherein the $\Delta_{good,n}$ is computed by $$\frac{P_T}{1-P_T} * \Delta_{bad,n},$$

where $P_T$ denotes a target PER of an initial transmission, and $\Delta_{bad,n}$ denotes an increment of the global offset value and the local offset value.

19. The apparatus of claim 13, wherein, if the MCS level of the burst allocated to the previous frame is greater than 0, the obtained local offset value is applied to Offset_Local(MCS)=max(Offset_Local(MCS),Offset_Local(MCS−1)−LT_DIFF(MCS)), and if this MCS level is less than a maximum MCS level, the obtained local offset value is applied to Offset_Local(MCS)=min(Offset_Local(MCS),Offset_Local(MCS+1)+LT_DIFF(MCS+1)) LT_DIFF(MCS)=LT(MCS)−LT(MCS−1), thereby finally decreasing the local offset value;
where LT(MCS) denotes a reference CINR value of a corresponding MCS level in the link table.

20. The apparatus of claim 13, wherein, if the MCS level of the burst allocated to the previous frame is 0, the obtained local offset value is applied to If abs (Offset_Local(1)+LT_DIFF(1)−Offset_Local(0))<LT_DIFF_MIN, Offset_Local(0)=Offset_Local(0)−Zero_Offset_Comp, thereby finally decreasing the local offset value;
where LT_DIFF(MCS) is LT(MCS)−LT(MCS−1), LT(MCS) denotes a reference CINR value of a corresponding MCS level in the link table, LT_DIFF_MIN is set to 1 as a default value, and Zero_Offset_Comp is set to 0.5 as a default value.

21. The apparatus of claim 13, wherein the global offset (i.e., Offset Global) value and the local offset (i.e., Offset_Local(MCS)) value are increased by Offset_Global=min(Offset_Global+$\Delta_{bad,n,Global}$, $P_{max,Global}$), Offset_Local(MCS)=min(Offset_Local(MCS)+$\Delta_{bad,n,Local}$, $P_{max,Local}$), where $P_{max,Global}$ denotes a maximum global offset value, $P_{max,Local}$ denotes a maximum local offset value, $\Delta_{bad,n,Global}$ is $(1-\alpha) \cdot \Delta_{bad,n}$, $\Delta_{bad,n,Local}$ is $(\alpha) \cdot \Delta_{bad,n}$, $\Delta_{bad,n}$ denotes an increment of the global offset value and the local offset value, and a denotes a weight of the local offset value.

22. The apparatus of claim 21, wherein, if the MCS level of the burst allocated to the previous frame is greater than 0, the obtained local offset value is applied to Offset_Local(MCS)=max(Offset_Local(MCS),Offset_Local(MCS−1)−LT_DIFF(MCS)), and if this MCS level is less than a maximum MCS level, the obtained local offset value is applied to Offset_Local(MCS)=min(Offset_Local(MCS),Offset_Local(MCS+1)+LT_DIFF(MCS+1)) LT_DIFF(MCS)=LT(MCS)−LT(MCS−1), thereby finally increasing the local offset value;
where LT(MCS) denotes a reference CINR value of a corresponding MCS level in the link table.

23. The apparatus of claim 21, wherein, if the MCS level of the burst allocated to the previous frame is 0, the obtained local offset value is applied to If abs(Offset_Local(1)+LT_DIFF(1)−Offset_Local(0)) <LT_DIFF_MIN, Offset_Local(0)=Offset_Local(0)−Zero_Offset_Comp, thereby finally increasing the local offset value;
where LT_DIFF(MCS) is LT(MCS)−LT(MCS−1), LT(MCS) denotes a reference CINR value of a corresponding MCS level in the link table, LT_DIFF_MIN is set to 1 as a default value, and Zero_Offset_Comp is set to 0.5 as a default value.

24. The apparatus of claim 13, wherein, if the information indicating success or failure in receiving the packet is not received from the MS during a specific frame, the FOLRC unit initializes the local offset value to zero and updates the global offset value by Offset_Global=min(Offset_Global+$\Delta_{nd,step}$,$P_{nd,max}$), where $P_{nd,max}$ denotes a maximum global offset value, and $\Delta_{nd,step}$ denotes an increment of the global offset value.

* * * * *